US010168441B1

(12) United States Patent
Nicolas et al.

(10) Patent No.: US 10,168,441 B1
(45) Date of Patent: Jan. 1, 2019

(54) SEISMIC STREAMER CONNECTING MODULE AND METHOD

(71) Applicant: SERCEL, Carquefou (FR)

(72) Inventors: Frédéric Nicolas, Saint Etienne de Montluc (FR); Loïc De Rességuier, Carquefou (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 15/626,513

(22) Filed: Jun. 19, 2017

(51) Int. Cl.
G01V 1/20 (2006.01)
G01V 1/38 (2006.01)

(52) U.S. Cl.
CPC ............ G01V 1/202 (2013.01); G01V 1/3843 (2013.01)

(58) Field of Classification Search
CPC .................................................... G01V 1/3843
USPC ......... 439/624, 649, 650, 652, 654, 49, 164, 439/165, 171, 173, 503, 579, 628, 644, 439/721, 660, 949; 701/21
See application file for complete search history.

(56) References Cited

U.S. PATENT DOCUMENTS

| | | | | |
|---|---|---|---|---|
| 3,359,527 A * | 12/1967 | Hart | ...................... | H01R 25/003 439/172 |
| 4,917,632 A * | 4/1990 | Smith | ..................... | H01R 31/02 439/278 |
| 5,199,893 A * | 4/1993 | Fussell | ................... | G01V 1/201 439/271 |
| 5,417,592 A * | 5/1995 | West | ........................ | H01R 4/70 439/278 |
| 6,011,752 A * | 1/2000 | Ambs | ................... | G01V 1/3826 114/242 |
| 7,407,392 B2 * | 8/2008 | Cooke | .................... | A47B 21/06 108/62 |
| 7,901,240 B2 * | 3/2011 | Jackson | ............... | H01R 4/5025 439/465 |
| 8,298,003 B2 * | 10/2012 | Wu | ........................ | H01R 31/06 439/501 |
| 8,500,492 B2 * | 8/2013 | Brown | ................... | H01R 35/04 439/638 |
| 9,475,553 B2 | 10/2016 | Roger et al. | | |
| 2008/0192570 A1 * | 8/2008 | Lennart Tenghamn | ..................... | G01V 1/3826 367/17 |

* cited by examiner

Primary Examiner — Harshad C Patel
(74) Attorney, Agent, or Firm — Patent Portfolio Builders PLLC

(57) ABSTRACT

Method and flush module for connecting streamer sections to an external device. The flush module includes a housing; a first end connector attached to the housing and configured to connect to a first element of the streamer spread; a second end connector attached to the housing and configured to connect to a second element of the streamer spread; and an external connector attached to the housing and configured to connect to a third element of the streamer spread. The external connector is configured to pivot between (a) a close position during which the external connector is entirely located within the housing, and (b) an open position during which a distal end of the external connector is located outside the housing.

18 Claims, 11 Drawing Sheets

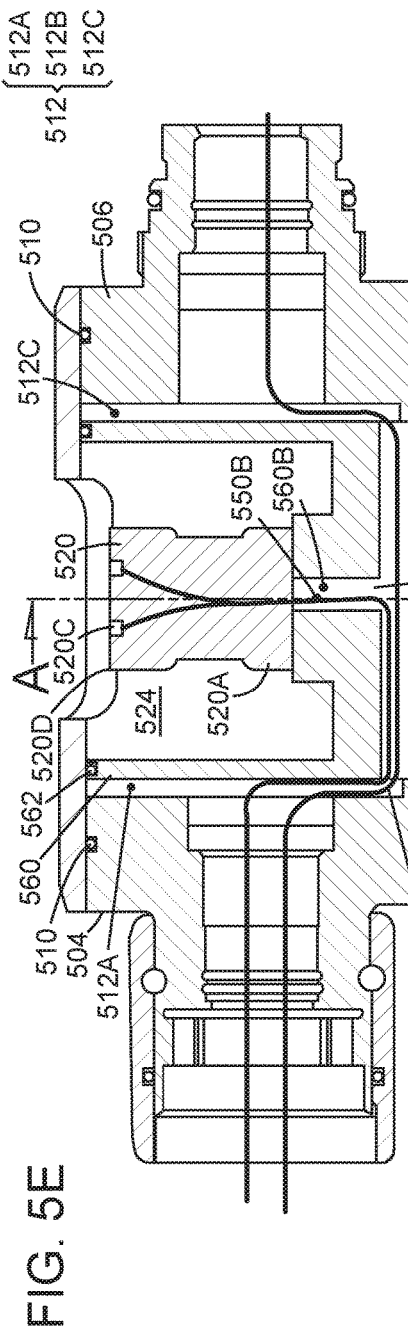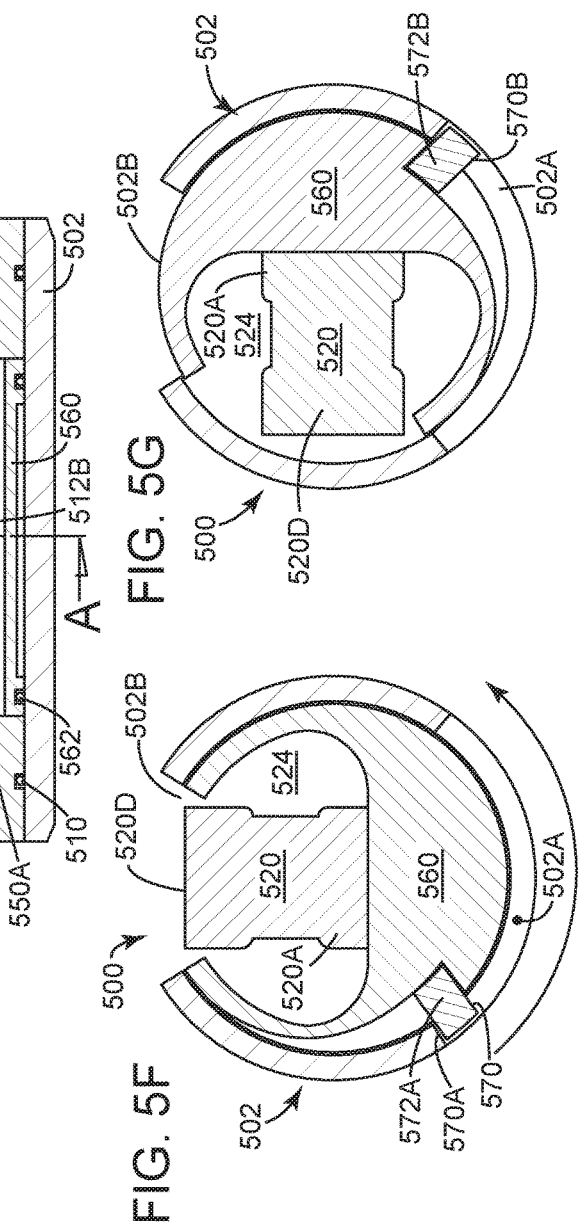

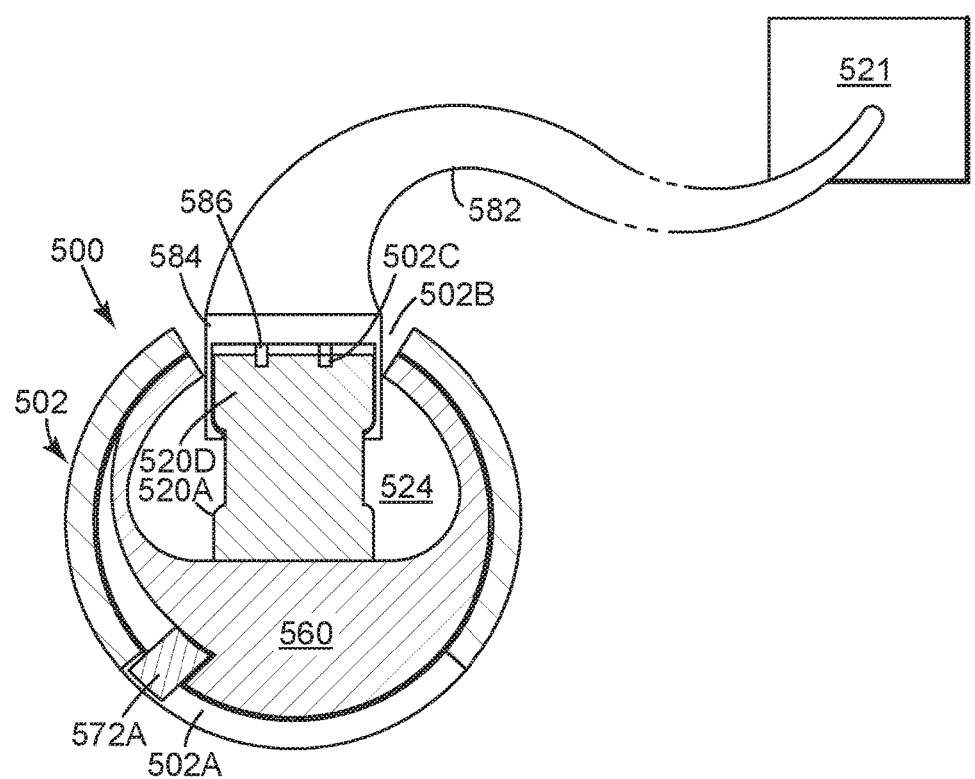

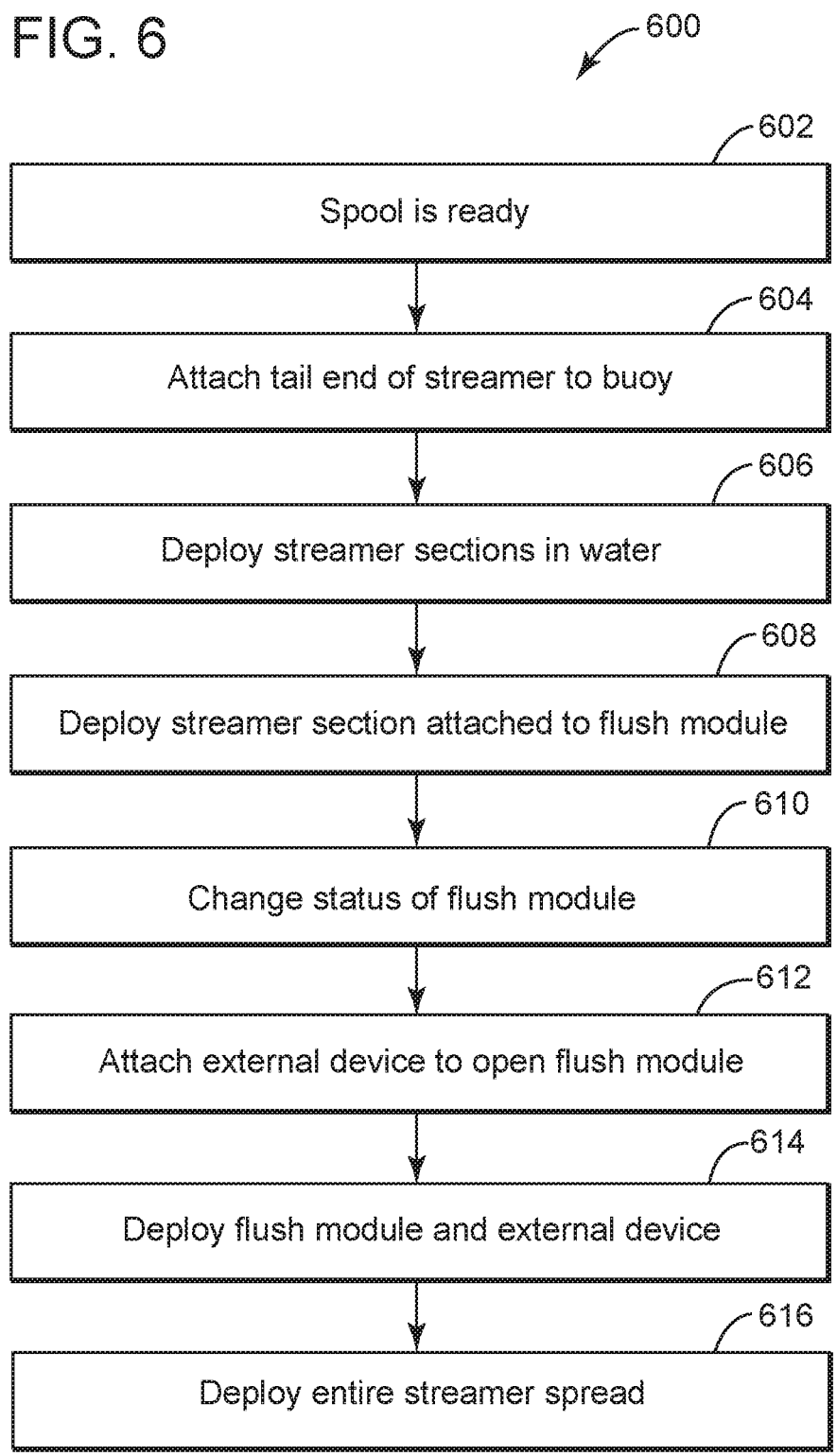

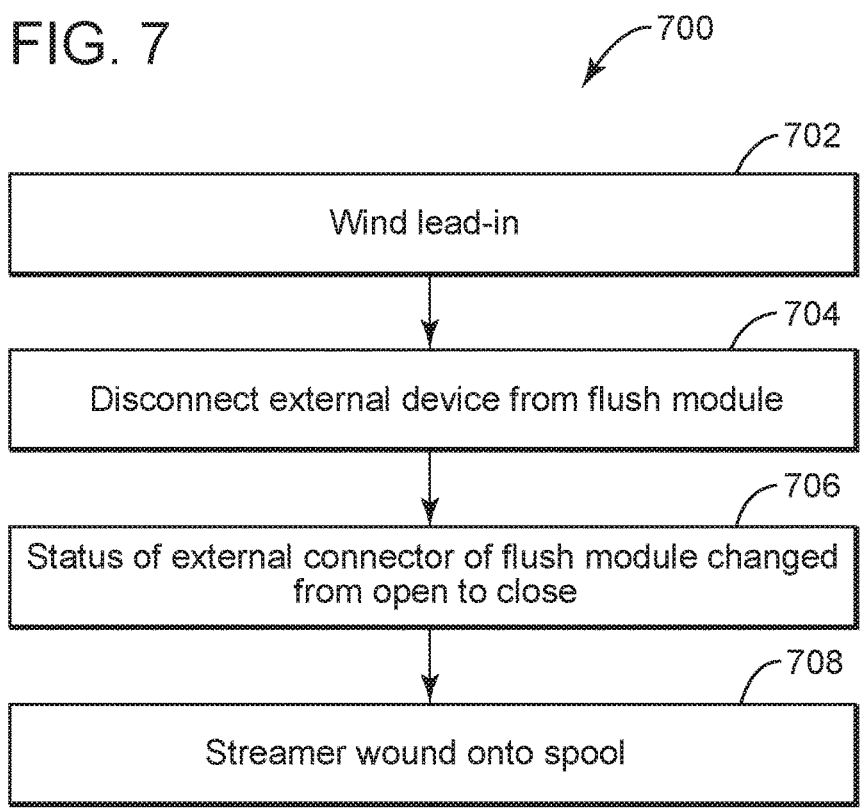

SEISMIC STREAMER CONNECTING MODULE AND METHOD

BACKGROUND

Technical Field

Embodiments of the subject matter disclosed herein generally relate to methods and systems and, more particularly, to mechanisms and techniques for connecting various streamer spread parts at a single location.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. The streamers may be disposed horizontally, i.e., lie at a constant depth relative to the ocean surface 118. Also, the plural streamers 116 may form a constant angle (i.e., the streamers may be slanted) with respect to the ocean surface or they may have a variable-depth profile (Broadseis, CGG). The totality of streamers and associated equipment (e.g., birds as disclosed in U.S. Pat. No. 9,475,553, the entire content of which is incorporated herein by reference) form a streamer spread.

Still with reference to FIG. 1, vessel 110 may also tow a seismic source array 120 configured to generate an acoustic wave. The acoustic wave propagates downward and penetrates the seafloor, eventually being reflected by a reflecting structure. The reflected acoustic wave propagates upward and is detected by detector 112. Parts of reflected acoustic wave (primary) are recorded by various detectors 112 (recorded signals are called traces) while other parts of the reflected wave pass detectors 112 and arrive at the water surface 118. Since the interface between the water and air is well approximated as a quasi-perfect reflector (i.e., the water surface acts as a mirror for acoustic waves), the water reflected waves are reflected back toward detector 112. These water-reflected waves are normally referred to as "ghost waves" because they are due to a spurious reflection. Ghosts are also recorded by detector 112.

The streamers are towed by the vessel along a pre-plot path X. Each streamer includes plural streamer sections. As an example, FIG. 1 shows streamer 116 having a streamer head 116A, and four sections 116-1 to 116-4. The streamer sections are connected to each other by corresponding modules 117. FIG. 1 shows, for simplicity, only three streamer modules 117. FIG. 2 shows the streamer module 117 in more details. The streamer modules offer the flexibility of customizing the streamers to have desired lengths and characteristics, to replace damaged parts without replacing the entire streamer, and also to facilitate the deployment and retrieval of the streamers.

During the seismic acquisition phase, the streamers 116 are maintained with a certain offset form each other along the cross-line direction Y by using a combination of ropes 120 and deflectors 122 located at the head of the streamers, as shown in FIG. 1. Also, for maintaining a certain depth of the streamer heads 116A, one or more floats 124 are connected to corresponding streamer heads. In order to connect the float 124 to the streamer head 116A and to the rope 120 (which may be a separation rope or a lead-in cable), a special connection module 130 is currently used. Such a module is called a module with external connection (or external module) and it is shown in FIG. 3. Comparing the streamer module 117 of FIG. 2 with the module with external connection 130, it is noted the extra connection 132, which connects in the example of FIG. 1 to the float 124. The extra connection 132 is not inline with the streamer sections 116-$i$, as indicated in FIG. 3. This module has a cylindrical shape to be linked with the streamer sections and a Y-shape portion 132 for the external connection.

Because of this shape, the winding or unwinding of the streamer on a spool, which is always performed at the beginning or end of the seismic survey, is hindered as the external connection is not flush with the streamer sections. For this reason, the process of winding or unwinding is stopped when a module with external connection 130 is encountered, the module is disconnected from the streamer sections and the float, and a streamer module 117 is put in place to keep the streamer together. It is noted that FIG. 1 shows the use of the module with external connection at the head of the streamer. However, for other equipment, it is possible to the have the module with external connection located anywhere along the streamer, not at its ends.

This process of stopping the winding/unwinding is time-consuming and thus, detrimental to the entire survey process. Thus, there is a need to find other means for connecting the various elements of the seismic survey system that do not require stopping the winding/unwinding process. Accordingly, it would be desirable to provide systems and methods with such capabilities.

SUMMARY

According to an embodiment, there is a flush module for connecting three elements associated with a streamer spread. The flush module includes a housing; a first end connector attached to the housing and configured to connect to a first element of the streamer spread; a second end connector attached to the housing and configured to connect to a second element of the streamer spread; and an external connector attached to the housing and configured to connect to a third element of the streamer spread. The external connector is configured to pivot between (a) a close position during which the external connector is entirely located within the housing, and (b) an open position during which a distal end of the external connector is located outside the housing.

According to another embodiment, there is a flush module for connecting three elements associated with a streamer spread. The flush module includes a housing, a first end connector attached to the housing and configured to connect to a first element of the streamer spread, a second end connector attached to the housing and configured to connect to a second element of the streamer spread, and an external connector attached to the housing and configured to connect to a third element of the streamer spread. The external connector is configured to rotate inside the housing, between (a) a close position during which a distal end of the external connector is facing a wall of the housing, and (b) an open position during which the distal end of the external connector is facing an opening in the wall of the housing.

According to still another embodiment, there is a method for unwinding a streamer from a spool. The method includes providing the spool on a towing vessel; deploying a plurality of streamer sections from the spool into the water, wherein the plurality of streamer sections are connected serially to each other; changing a status of an external connector of a flush module, from a close position to an open position, wherein the flush module connects a streamer section of the plurality of streamer sections to another element of a streamer spread; attaching an external device to the external connector of the flush module; and deploying the flush module and the external device into water.

According to yet another embodiment, there is a streamer for acquiring seismic data in a marine environment. The streamer includes a first streamer section; a second streamer section; and a flush module for connecting the first streamer section, the second streamer section, and an external device. The flush module is one of those discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A-5H illustrate another flush module that has an external connector for connecting an external device;

FIG. 6 is a flowchart of a method for deploying a streamer in water, the streamer having at least one flush module; and FIG. 7 is a flowchart of a method for retrieving a streamer from water, the streamer having at least one flush module.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a flush module with an external connector for connecting together two streamer sections and one external device. However, the embodiments to be discussed next are not limited to these elements. The flush module with the external connector may be used to connect other elements used in a seismic marine acquisition system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, the flush module includes a first end configured to be mechanically connected to a first streamer section, a second end configured to be mechanically connected to a second streamer section, and a movable connector configured to be mechanically connected to an external device. The flush module also includes an electrical transmitting structure configured to electrically connect the first streamer section, the second streamer section and the external device. The flush module further includes a data transmission structure for transmitting data among the first streamer section, the second streamer section, and the external device. One of these transmitting structures may also be used to transmit power.

Figure 3:
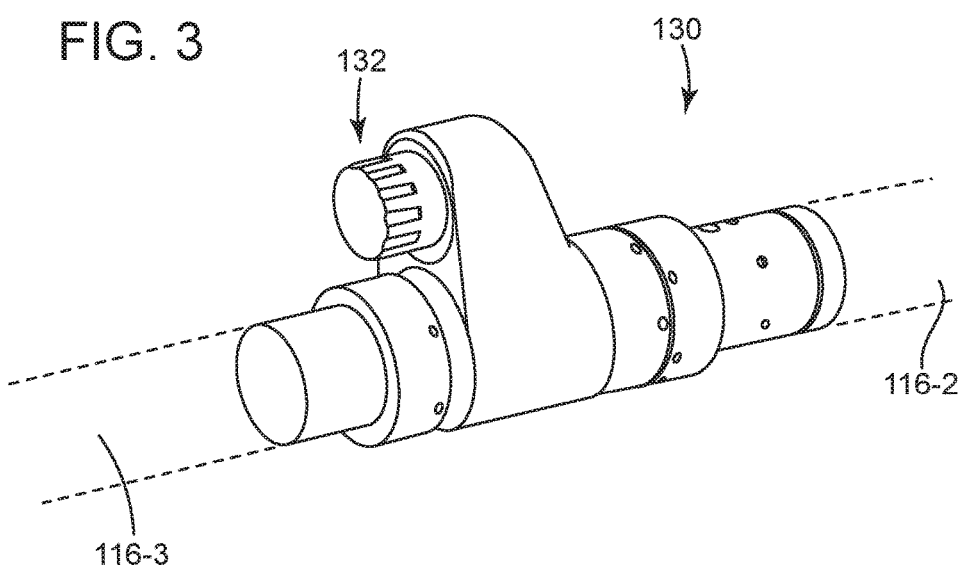
FIG. 3 illustrates a module with an external connector for connecting two streamer sections and an external device to each other.

The flush module, by having a small cross-section profile, similar to the cross-section of the streamer sections, removes the need to connect or disconnect the streamer sections during the winding/unwinding process, minimizes the weight attached to the streamer, reduces the amount of streamer connectors needed on board of the towing vessel and minimizes the hydrodynamic noise created by a traditional module with external connection (illustrated in FIG. 3) while the streamer is towed underwater.

Figure 4A:
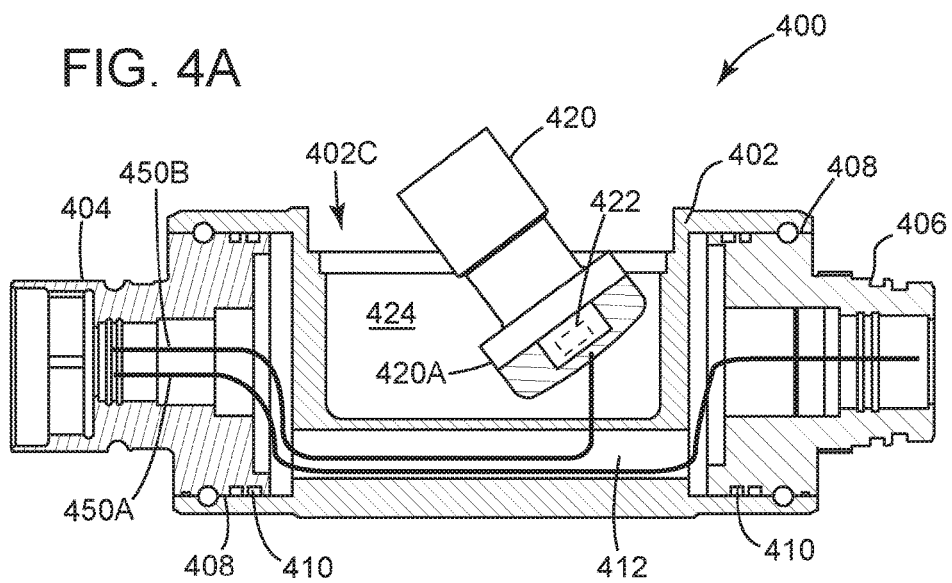
FIGS. 4A-4E illustrate a flush module that has an external connector for connecting an external device.
Figure 4B:
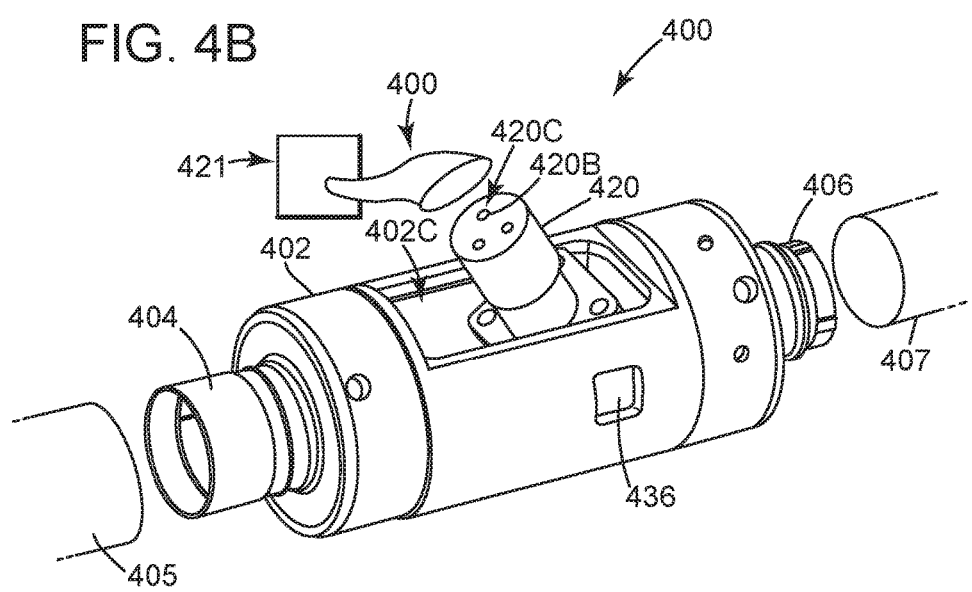

Various embodiments of such a flush module are now discussed. FIGS. 4A-4E illustrate an embodiment of a flush module 400 in which the external connector pivots between (i) an "open" position, as illustrated in FIGS. 4A and 4B, when the external connector can be connected to the external device, to (ii) a "close" position, as illustrated in FIGS. 4D and 4E, when the external connector is fully within the housing of the flush module so that a connection with the external device cannot be established.

Flush module 400 is shown in FIGS. 4A and 4B having a housing 402 that includes the various elements that form the module. Some of the elements of the flush module are the first end connector 404, the second end connector 406, and the external connector 420. One of the first and second end connectors is a male connector while the other one is a female connector. These connectors are manufactured to mate with corresponding male or female connectors attached to ends of the streamer sections 405 and 407. This means that each streamer section 405 and 407 has male and female end connectors at its two ends. The external connector 420 is configured to connect to an external device 421, as discussed later. In one application, the external device 421 is not part of the streamer and for this reason is called an "external" device. Note that streamer sections 405 and 407 and flush module are part of the streamer, and thus, they are "internal" elements.

The external connector 420 is shown in FIGS. 4A and 4B as being open (i.e., in the open state) and ready for connecting with the external device 421. External connector 420 may be a female or male connector, similar to or different from the first and second end connectors 404 and 406. External connector may have a distal end 420C that is located outside the housing 402 when the external connector is in the open state. FIG. 4A shows the distal end 420C extending through an opening 402C of housing 402, outside the housing.

FIG. 4A shows the first and second end connectors being attached to the housing 402, i.e., they can be removed if necessary. FIG. 4A also shows that there is an interface 408 between the housing 402 and the end connectors 404 and 406. Because ambient (external) water may leak along the interface 408, inside a dry chamber 412 formed within the housing 402, one or more seals 410 (e.g., O-ring seals) are placed between the housing and the end connectors to prevent such leaking.

Figure 4C:
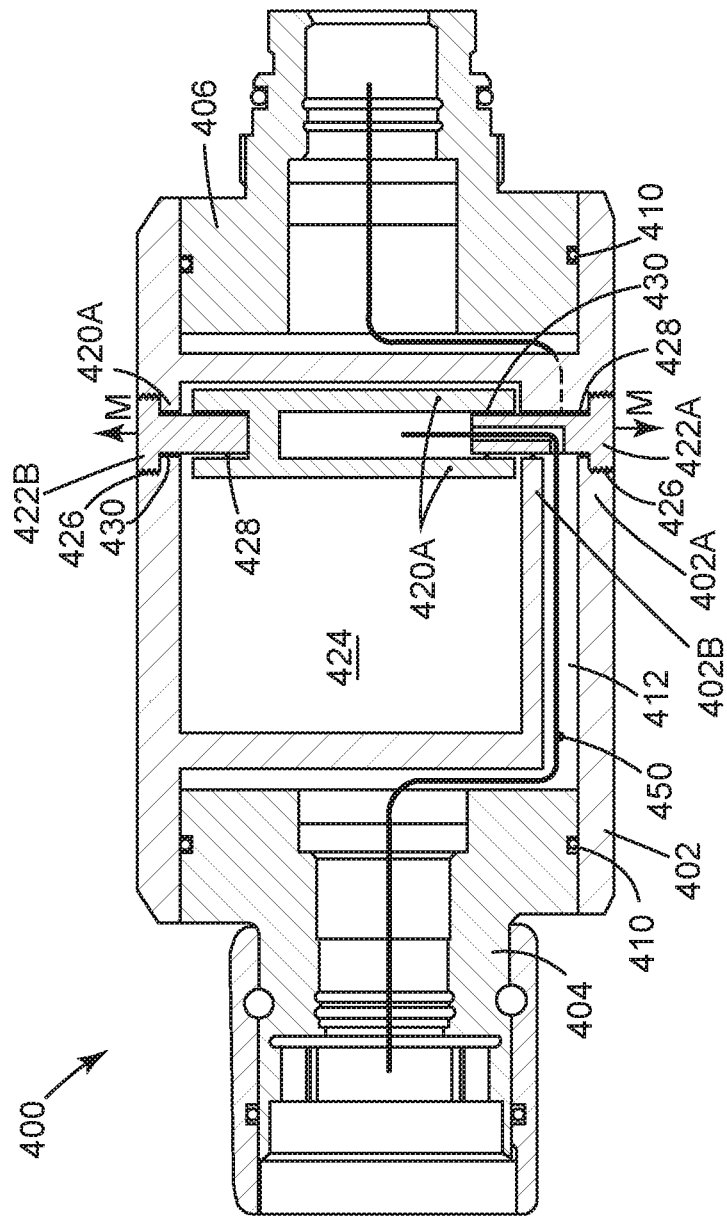
Figure 4D:
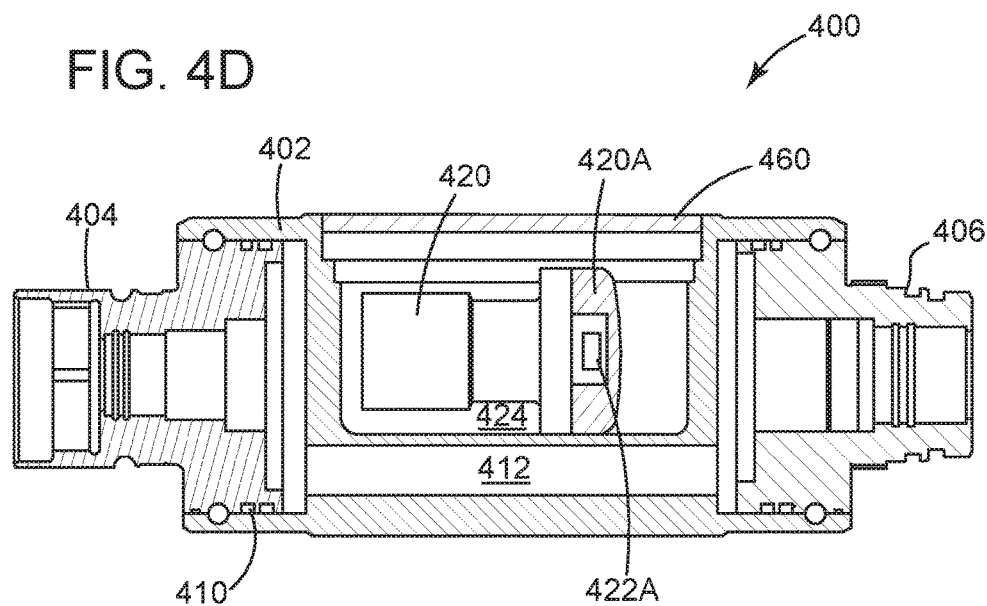
Figure 4E:
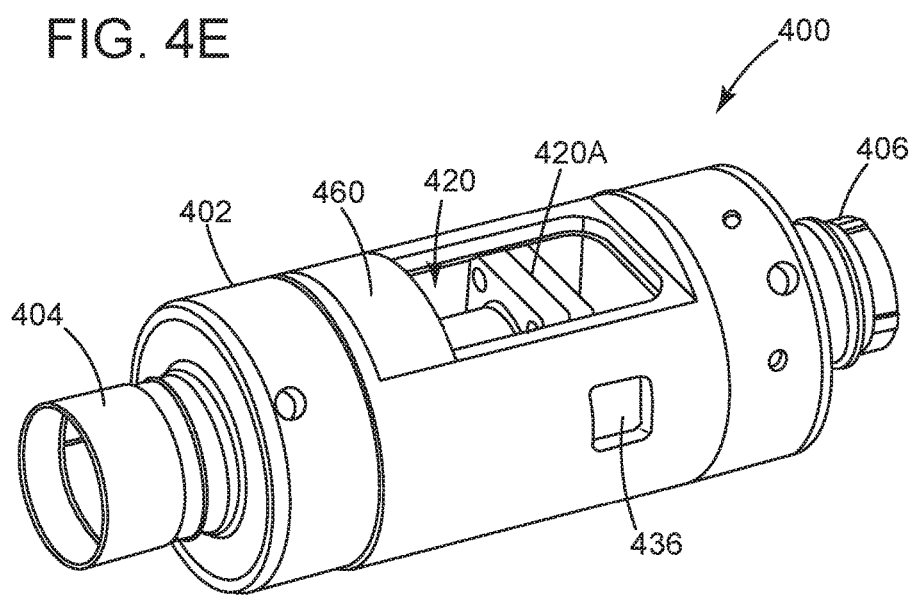

The external connector 420 is attached to the housing 402 with one or more shafts 422 as now discussed with regard to FIG. 4C. FIG. 4C shows two shafts 422A and 422B, each entering from outside the housing 402, through a wall 402A of the housing, inside a wet chamber 424, located inside the housing 402. One shaft 422A may be screwed into the wall 402A of the housing 402, as indicated by threads 426. To prevent the ambient water entering the dry chamber 412, various seals 428 and 430 may be placed between the shaft 422A and the housing 402. FIG. 4C shows (1) static seals 428 (a seal located between no moving parts) being placed between an outside wall 402A or an inside wall 402B of the housing 402, and the shaft 422A, and (2) dynamic seals 430 (a seal located in contact with a moving part) being placed between a base 420A of the external connector 420 and the shaft 422A. In one embodiment, only one type of seals is used.

The other shaft 422B also enters from outside the housing 402, through an external wall 402A, and enters inside wet chamber 424 to connect with base 420A of external connector 420. Static seals 428 and/or dynamic seals 430 may also be used for preventing ambient water to enter dry chamber 412. Shaft 422B may have threads 426 for being attached in a fixed manner to the external wall 402A of housing 402.

Shafts 422A and 422B and base 420A of external connector 420 are in a rotating relation, i.e., the base 420A can rotate (pivot) relative to the shafts 422A and 422B to achieve the open position shown in FIGS. 4A and 4B or the close position shown in FIGS. 4D and 4E. In other words, the first and second shafts allow the external connector to pivot about an axis M extending through the first and second shafts. In one application, the two shafts are opposite to each other.

FIG. 4C also shows a transmitting structure 450, which is configured to transmit data and/or electrical power and/or commands among the various elements of the streamer and seismic system. In one application, transmitting structure 450 may be implemented as a cable with plural wires. Transmitting structure 450 is located in the dry chamber 412 and extends from first end connector 404 to the second end connector 406. Transmitting structure 450 also extends from one of the end connectors to the external connector 420. In one embodiment, if the transmitting structure 450 is a cable, it can be split into two separate cables, one extending from the first end connector 404 to the second end connector 406, and the other one from the first end connector 404 to the external connector 420. In another embodiment, the transmission structure 450 may include two different cables, both of which extend from the first end connector 404. In this embodiment, a first cable 450A (shown in FIG. 4A) extends to the second end connector 406 and a second cable 450B (also shown in FIG. 4A) extends to the external connector 420. FIG. 4B shows the external connector 420 having one or more pins 420B.

Figure 1:
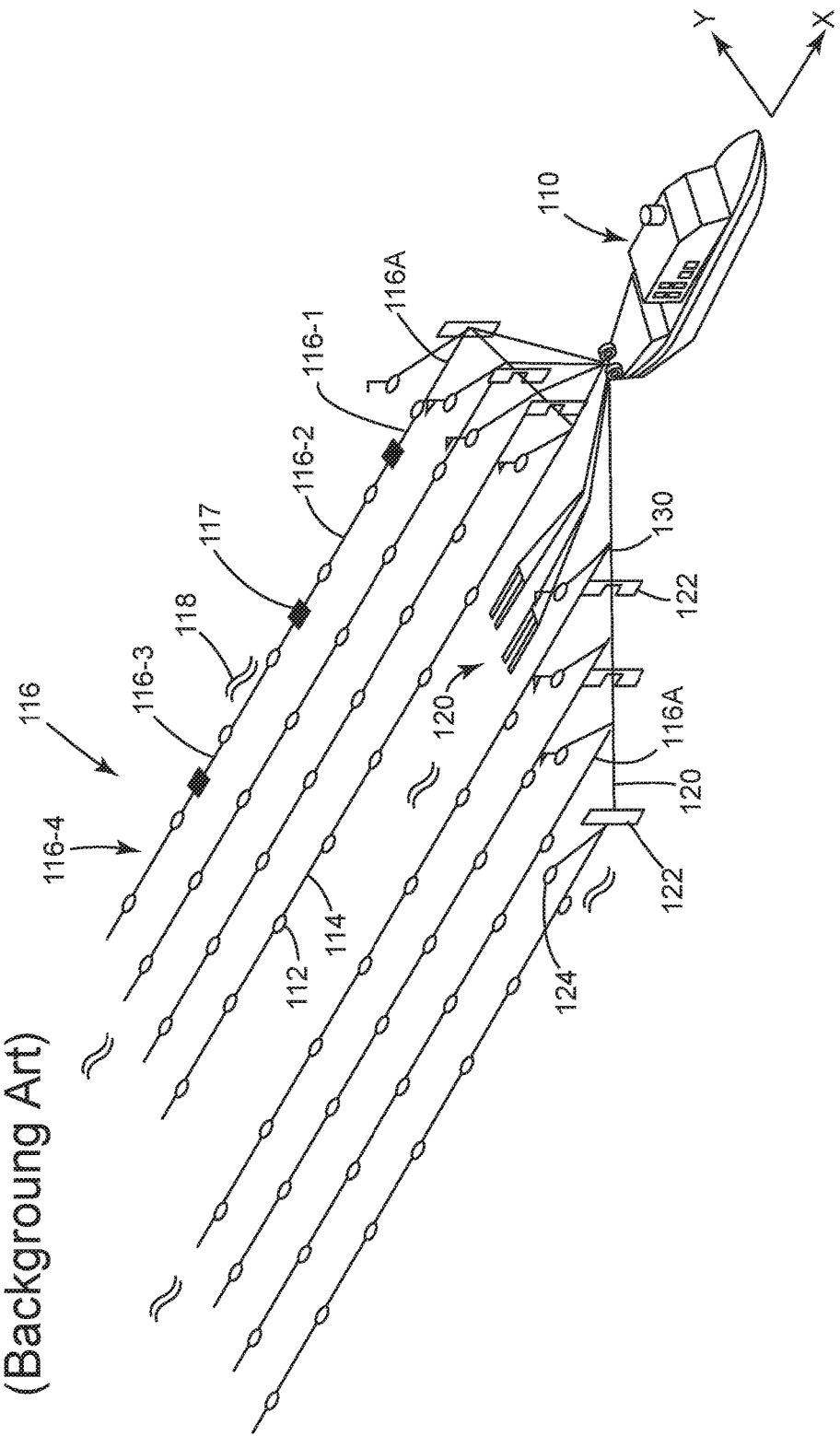
FIG. 1 is a schematic diagram of a conventional seismic data acquisition system having plural horizontal streamers.
Figure 2:
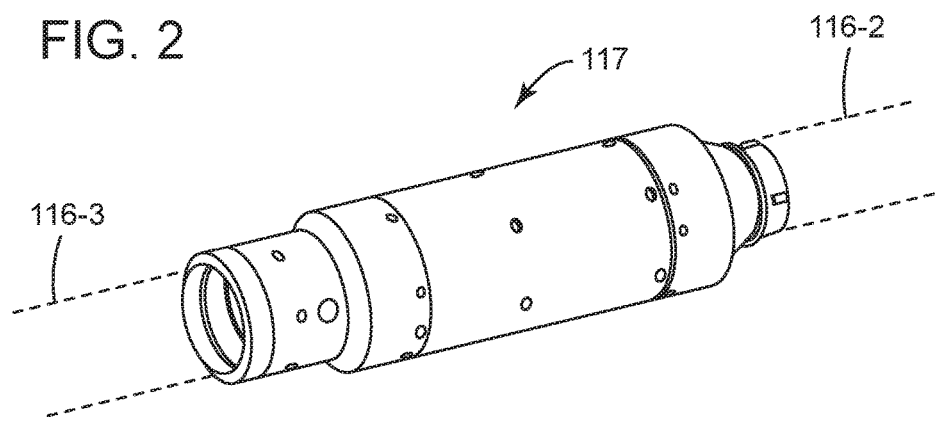
FIG. 2 illustrates a streamer module that connects two streamer sections to each other.

FIGS. 4D and 4E show the external connector 420 in the close position. It is noted that external connector 420 completely fits inside wet chamber 424, so that no drag and/or noise is produced in this position. Also, the external diameter of the flush module 400 is comparable, if not identical, to a traditional connector shown in FIG. 2. In one application, wet chamber 424 is open to the ambient and the sea water freely enters inside. However, it is possible to add a cover 460 (partially shown in FIG. 4E) to close chamber 424 (e.g., seal it from the ambient when the external device is not connected to the external connector).

According to another embodiment, illustrated in FIGS. 5A-5H, a flush module 500 has a housing 502, a first end connector 504 and a second end connector 506, all of them similar to the embodiment of FIGS. 4A-4E. Thus, the description of these elements is now omitted.

Figure 5A:
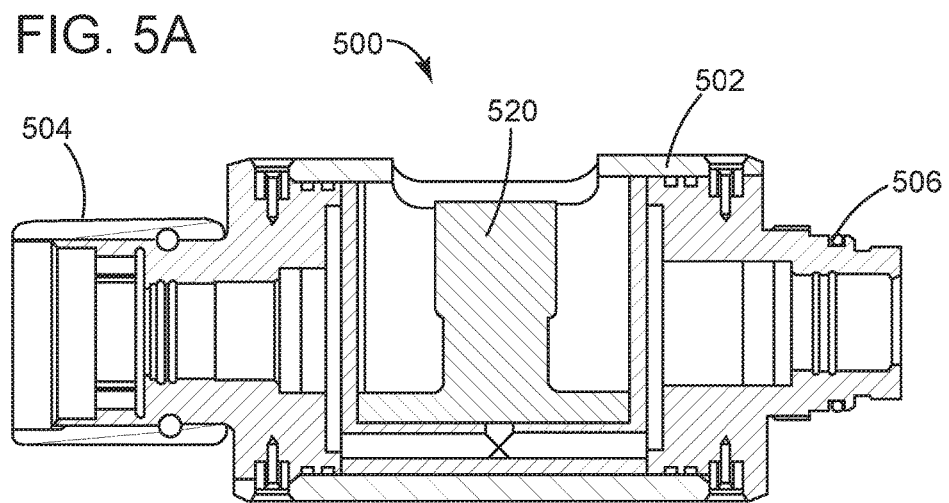
Figure 5B:
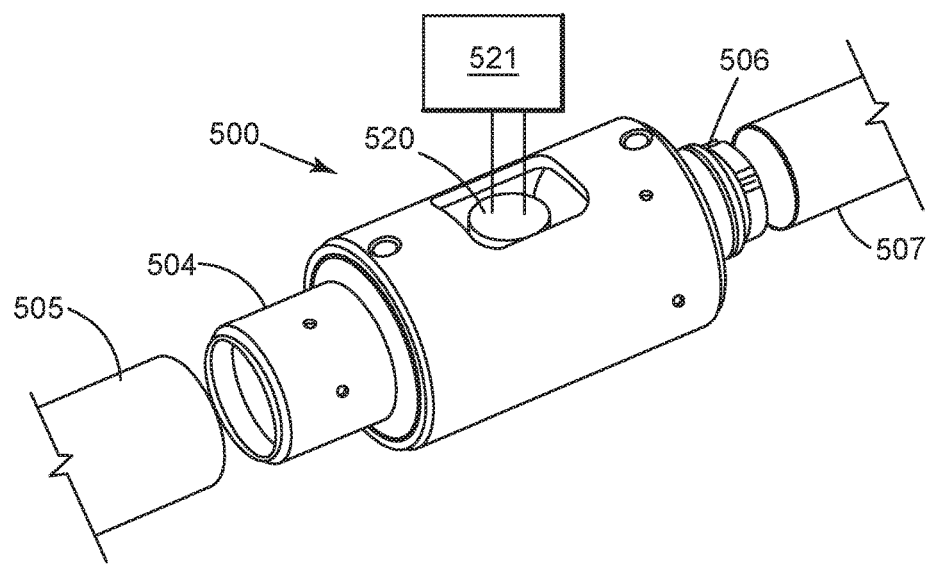
Figure 5C:
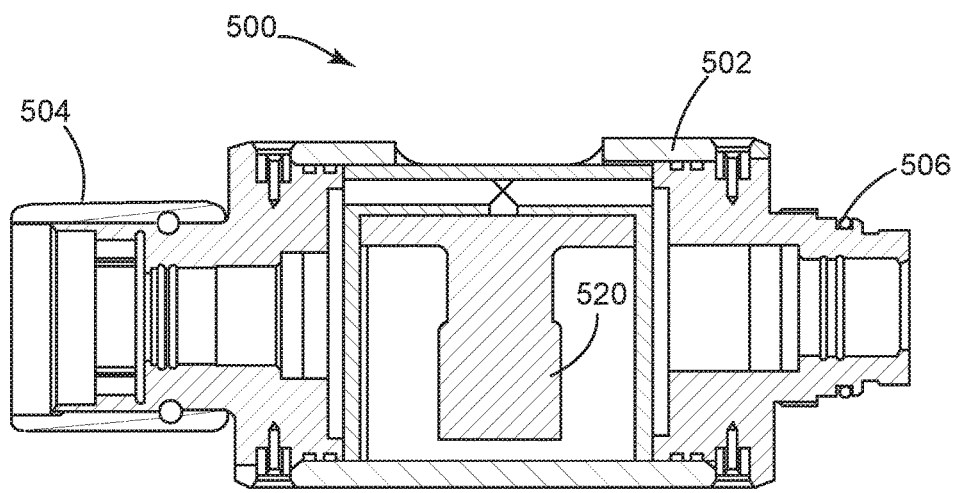
Figure 5D:
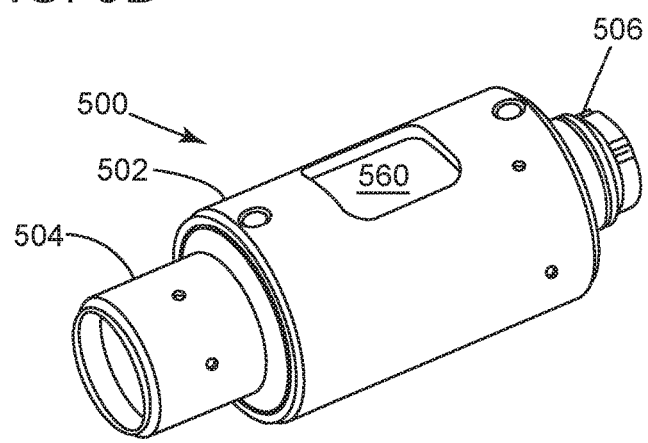

What is different from the previous embodiment, is the external connector 520, which is now permanently located within the housing. The external connector 520 is now configured to rotate between an "open" position and a "closed" position, and not pivot. FIGS. 5A and 5B shows the open position and the external connector 520 located inside the housing and ready to connect to the external device. FIGS. 5C and 5D show the close position and the external connector rotated inside the housing, not being able to connect with the external device.

The internal structure of this flush module is now discussed with regard with FIGS. 5E-5H. FIG. 5E shows a longitudinal cross-section through the flush module while FIGS. 5F and 5G show cross-sectional views of the flush module. FIG. 5F shows the external connector in the open position while FIG. 5G shows the external connector in the close position.

FIG. 5E shows the housing 502, the first end connector 504, the second end connector 506, seals 510, dry chamber 512, base 520A of external connector 520, wet chamber 524, first cable 550A and second cable 550B, all of which are similar to the elements already discussed with regard to FIGS. 4A-4E. The first and second connectors are manufactured to mate with corresponding male or female connectors attached to ends of streamer sections 505 and 507. Each streamer section 505 and 507 has male and female end connectors at its two ends. In one application, the second streamer section 506 may be a lead-in or another marine element used in a seismic survey system. The external connector 520 is configured to connect to an external device 521, as discussed later.

What is different relative to the previous embodiment, is a bracket 560 located inside housing 502, to form wet chamber 524. Base 520A is fixedly attached to bracket 560, by known mechanisms, e.g., welding, bolts, etc. In one application, bracket 560 and external connector 520 are formed as a single piece. Irrespective of the implementation, base 520A of external connector 520 moves in unison with bracket 560. Bracket 560 is configured to rotate within housing 502 while maintaining a seal between the interior walls of the housing and the bracket. In other words, due to seals 562 distributed along various locations between the bracket 560 and housing 502, the dry chamber 512 is maintained dry so that ambient water may enter wet chamber 524, but not the dry chamber. FIG. 5E shows that dry chamber 512 is formed by three different portions: a first portion 512A located between the first end connector 504 and the bracket 560, a second portion 512B formed as a conduit through the body of bracket 560, and a third portion 512C formed between the second end connector 506 and the body of the bracket 560.

The dry chamber 512 ensures that cables 550A and 550B are insulated from the ambient water, thus preventing corrosion and/or damage to the electrical equipment of the streamer sections and flush module. Note that FIG. 5E shows the second portion 512B also communicating with a conduit 560B, formed in the body of bracket 560, for allowing the second cable 550B to reach a distal end 520D of the external connector. One or more pins 520C may be located on the distal end 520D (shown in FIGS. 5E and 5H) of the external connector 520 for connecting with the external device.

FIGS. 5F and 5G shows a transversal cross-section through the flush module 500, along lines A-A in FIG. 5E. In one application, screw 572A is inserted into the wall 502A of the housing 502, at a predetermined position, to achieve a mechanical stop for the external connector, i.e., when the external connector is opened, it should not go further than the position shown in FIG. 5F. In other words, when the external connector is in the closed position, the external connector simply stays inside the housing 502 as in FIG. 5C. When the external connector is opened, it is rotated until the external connector contact screw 5702A, reaching the opened position. After the external connector is connected to the external device, its open position is maintained by this connection. Alternatively, to maintain the external connector 520 in place in the open position, a first hole 570A is formed in the wall 502A of the housing 502 and a first screw 572A (or other equivalent structures) is entered into the bracket 560, through the wall 502A, as shown in FIG. 5F. When the external connector 520 needs to be moved to the close position, screw 572A is removed, external connector 520 is rotated (e.g., manually) together with bracket 560 until it reaches the close position shown in FIG. 5G, and then a second screw 572B (or the same screw 572A) is entered through a second hole 570B, through wall 502A. It is noted that the opening 502B formed in the housing 502, exposes the distal end 520D of the external connector 520 when in the open position (see FIG. 5F). The opening 502B is covered by the body of the bracket 560 when the external connector 520 is in the close position (see FIG. 5G) and thus, distal end 520D cannot be connected to the external device. In each embodiment, the screws that are used to fix the external connector in place may be designed to be handled by a special tool, for example, a C-spanner or other similar tool. In one application, the screw(s) may be replace by a pin.

FIG. 5H shows the external connector in the open position and the external device 521, which can be a buoy, bird, recovery device, GPS system, cleaning device, a float, etc., connected to the external connector. External device 521 may have its own cable 582 that connects to external connector 520 with a mating head 584, for example, if external device is a GPS or buoy or float. However, if the external device 521 may directly connect to external connector, without any cable, as for example, a bird or a recovery device. Note that these elements are not at scale. One or more pins 586 are shown connected to mating pins 520C formed in the external connector. Pins 586 and 520C can be male-female or female-male pairs. They ensure that data and/or power is exchanged between the external device and the flush module.

The various implementations of the flush module discussed above may have the same mechanical specifications as a traditional streamer connector. The use of the novel flush module no longer imposes the time-consuming procedure of connecting/disconnecting the module during the winding/unwinding process. Now, it is enough to move the external connector from the open position to the close position (after the external device has been disconnected) and continue the winding or unwinding process. In other words, the entire flush module is not necessary to be removed and a traditional connector to be added to keep the various streamer sections in place. The flush module also improves the storage and production operations on the vessel, as there is no need for additional traditional connectors to replace the modules with external connectors. The overall dimensions and weight of the flush module is reduced relative to the traditional external module shown in FIG. 3. In one embodiment, the flush shape of the flush module also reduces the hydrodynamic noise associated with the movement of the module in water, when towed with the streamer by the towing vessel.

A method for using the flush module during the winding/unwinding of the streamer is now discussed with regard to FIGS. 6 and 7. FIG. 6 illustrates a method 600 for unwinding, from a spool, a streamer having at least one flush module 500. In step 602, the spool having an entire streamer is ready for being unwounded. The spool is located at the back of the towing vessel. For a seismic survey system, it is possible to have plural spools for this operation. The streamer is made of many streamer sections, and the sections are connected to each other with streamer modules. The tail end of the streamer may be attached to a tail buoy in step 604 and then deployed in water. The streamer sections are then released in water, in step 606, one by one. Note that the streamer sections are already connected to each other through streamer modules (e.g., those shown in FIG. 2). At a certain location along the streamer (which can be at the streamer head, in the middle of the streamer or even at the tail of the streamer), there is the flush module in the close position. When one of the streamer section connected to the flush module has been deployed in water in step 608, and the other streamer section or lead-in attached to the flush module is still on the spool, the flush module is reachable. The operator, with the help of a special tool, changes in step 610 the status of the flush module from close to open. If the flush module 400 is used, this means that the external connector 420 pivots and its head is exposed. If the flush module 500 is used, this means that the external connector 520 is rotated, with the special tool, until the external connector 520 has its distal end exposed. In step 612, a mating connector from the external device is attached to the external connector 420 or 520, and in step 614 the flush module with the external device are deployed in water. Then, in step 616, the next streamer section or the lead-in is deployed in water and the process continues until the entire streamer spread is in water. In step 612, the external device may be a buoy, bird, or any other device that is typically attached externally to a streamer. Note that because of this new module, the external device may be attached/disconnected when the streamer is already deployed, i.e., workboat operation. Because of the transmitting structure 450, data from the vessel may be transmitted both to the external device and the other streamer sections. Conversely, data (e.g., seismic data) from the receivers of the streamer sections and/or data (e.g., positional data) from the external device can be transmitted through the flush module to the vessel.

If the flush module is the one illustrated in FIGS. 5F-5H, step 610 has the following sub-steps: (i) the special tool is used to remove one screw that maintains the external connector in the close position, (ii) the external connector and the corresponding bracket are rotated, and (iii) the same screw or another one is attached to the bracket, through the wall of the housing, to maintain the external connector in the open position. Otherwise, step 610 consists of only opening the external connector until reaching a mechanical stop.

The winding of the streamer on the spool is now discussed with regard to method 700 illustrated in FIG. 7. In step 702, the lead-in is wound on the spool until the flush module is in view. In step 704, an external device is disconnected from the external connector of the flush module, and in step 706, the external connector of the flush module is changed from the open position to the close position. Then, in step 708, the next section of the streamer section is wound on the spool and this process continues until the entire streamer is on the spool. Note that this method avoids the time-consuming steps of (1) detaching three elements from the external module, i.e., two streamer sections and the external device or a streamer section, a lead-in and the external device, (2) replacing the external module with a traditional module, and (3) connecting the two streamer sections or the streamer section and the lead-in cable to the traditional module, prior to continuing the winding process of the streamer on the spool.

By using the flush module, both methods 600 and 700 streamline the winding/unwinding process and reduce the time necessary for streamer deployment or recovery. In addition, as already discussed above, the shape of the flush module is similar to the traditional streamer module, which is hydrodynamic and does not increase the noise generated when the streamer is towed underwater contrary to the Y shape module.

The disclosed embodiments provide a flush module and a method for streamer winding/unwinding during a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A flush module for connecting three elements associated with a streamer spread, the flush module comprising:
   a housing;
   a first end connector attached to the housing and configured to connect to a first element of the streamer spread;
   a second end connector attached to the housing and configured to connect to a second element of the streamer spread; and
   an external connector attached to the housing and configured to connect to a third element of the streamer spread,
   wherein the external connector is configured to pivot between (a) a close position during which the external connector is entirely located within the housing, and (b) an open position during which a distal end of the external connector is located outside the housing.

2. The flush module of claim 1, further comprising:
   first and second shafts attached to the housing and entering through a base of the external connector,
   wherein the first and second shafts allow the external connector to pivot about an axis extending through the first and second shafts.

3. The flush module of claim 2, wherein the first and second shafts are screwed into a wall of the housing.

4. The flush module of claim 1, further comprising:
   a transmitting structure extending inside the housing, from (1) one of the first end connector, the second end connector, and the external connector, to (2) another one of the first end connector, the second end connector, and the external connector.

5. The flush module of claim 4, wherein the transmitting structure includes cables for transmitting data between the first and second elements, which are streamer sections.

6. The flush module of claim 4, wherein the transmitting structure includes cables for transmitting electric power between the first element and the third elements, which are a streamer section and a buoy.

7. The flush module of claim 1, wherein the housing includes a dry chamber and a wet chamber, the dry chamber housing electrical cables and the wet chamber housing the external connector.

8. The flush module of claim 1, further comprising:
   an electrical cable extending through the external connector and being coupled to the first end connector.

9. A flush module for connecting three elements associated with a streamer spread, the flush module comprising:
   a housing;
   a first end connector attached to the housing and configured to connect to a first element of the streamer spread;
   a second end connector attached to the housing and configured to connect to a second element of the streamer spread; and
   an external connector attached to the housing and configured to connect to a third element of the streamer spread,
   wherein the external connector is configured to rotate inside the housing, between (a) a close position during which a distal end of the external connector is facing a wall of the housing, and (b) an open position during which the distal end of the external connector is facing an opening in the wall of the housing.

10. The flush module of claim 9, further comprising:
    a bracket located within the housing and configured to rotate relative to the housing.

11. The flush module of claim 10, wherein the external connector is fixedly attached to the bracket.

12. The flush module of claim 10, wherein the bracket includes a conduit.

13. The flush module of claim 12, further comprising:
    a first cable extending through the conduit and connecting the first end connector to the second end connector.

14. The flush module of claim 13, further comprising:
    a second cable extending through the conduit and connecting the first end connector to the external connector.

15. The flush module of claim 10, further comprising:
    a screw that enters through a first hole in a wall of the housing, into the bracket, to fix the external connector in the open position.

16. The flush module of claim 15, wherein the screw enters through a second hole in the wall, into the bracket, to fix the external connector in the close position.

17. The flush module of claim 9, wherein the first element is a streamer section, the second element is a lead-in and the third element is a connecting cable for a buoy.

18. A streamer for acquiring seismic data in a marine environment, the streamer including:
- a first streamer section;
- a second streamer section; and
- a flush module for connecting the first streamer section, the second streamer section, and an external device, wherein the flush module comprises:

a housing, a first end connector attached to the housing and configured to connect to the first streamer section, a second end connector attached to the housing and configured to connect to the second streamer section, and an external connector attached to the housing and configured to connect to the external device, wherein the external connector is configured to pivot between (a) a close position during which the external connector is entirely located within the housing, and (b) an open position during which a distal end of the external connector is located outside the housing.

* * * * *